(12) United States Patent
Kato et al.

(10) Patent No.: US 6,347,117 B1
(45) Date of Patent: Feb. 12, 2002

(54) APPARATUS AND METHOD FOR ENCODING IMAGES AND MEDIUM IN WHICH IMAGE ENCODING PROGRAM HAS BEEN RECORDED

(75) Inventors: Goro Kato; Kanji Mihara, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/988,550

(22) Filed: Dec. 10, 1997

Related U.S. Application Data

(63) Continuation of application No. PCT/JP97/01266, filed on Apr. 11, 1997.

(30) Foreign Application Priority Data

Apr. 12, 1996 (JP) .............................................. 8-115709
Sep. 30, 1996 (JP) .............................................. 8-259729

(51) Int. Cl.⁷ ................................................ H04N 7/12
(52) U.S. Cl. .............................. 375/240.05; 375/240.12
(58) Field of Search ....................... 375/240.12, 240.13, 375/240.15, 240.25, 240.05; 348/419.1, 394.1, 401.1, 404.1, 409.1

(56) References Cited

U.S. PATENT DOCUMENTS

| | | | | |
|---|---|---|---|---|
| 5,255,090 A | * | 10/1993 | Israelsen | ................ 375/240.12 |
| 5,317,397 A | | 5/1994 | Odaka et al. | |

(List continued on next page.)

FOREIGN PATENT DOCUMENTS

| | | |
|---|---|---|
| EP | 545874 | 6/1993 |
| EP | 645930 | 3/1995 |
| EP | 713341 | 5/1996 |
| JP | 4-337990 | 11/1992 |

(List continued on next page.)

OTHER PUBLICATIONS

Hiroshi Yasuda, Yuu Watanabe "Fundamental of Digital Image Compression (in Japanese)", Jan. 20, 1996, Nikkei BP Shuppan Center, p. 189–200.

The Journal of the Inst. of Television Engineers of Japan, vol. 49, No. 4, Apr. 1995 (Tokyo), Toshinori Odaka "3-2-5 rate control and buffer control (in Japanese)" p. 455–458.

*Primary Examiner*—Nhon T Diep
(74) *Attorney, Agent, or Firm*—Frommer Lawrence & Haug LLP; William S. Frommer

(57) ABSTRACT

In the case where the code generation volume that the data occupancy rate in the buffer of the image decoding apparatus is smaller than the first, second or the third threshold value corresponding to the first, second or the third image currently being coded from among the first, second and third threshold values of the data occupancy rate set corresponding to the first image to be intra-coded, the second image to be directionally predictive coded and the third image to be bidirectionally predictive coded respectively, the coding processing on the first, second or the third image presently being coded will be stopped. Further, the coding controlling unit 15 calculates the occupancy rate in a VBV buffer by a VBV buffer occupancy rate calculating unit 43 to obtain the coding difficulty representing the difficulty of the coding of image flowing to the image of which the coding is complete by a coding difficulty calculating unit 42, and stops the coding of image to be coded next in the case where the VBV buffer occupancy rate is smaller than the predetermined occupancy rate determining threshold value and also the coding difficulty matches with the predetermined standard, when an image has been coded.

12 Claims, 8 Drawing Sheets

U.S. PATENT DOCUMENTS

| | | |
|---|---|---|
| 5,452,103 A | 9/1995 | Brusewitz |
| 5,541,661 A | 7/1996 | Odaka et al. |
| 5,719,632 A * | 2/1998 | Hoang et al. .......... 375/240.05 |
| 5,874,765 A * | 12/1998 | Sanpei ................. 375/240.05 |

FOREIGN PATENT DOCUMENTS

| | | |
|---|---|---|
| JP | 5-14876 | 1/1993 |
| JP | 5-111012 | 4/1993 |
| JP | 5-260459 | 10/1993 |
| JP | 6-30396 | 2/1994 |
| JP | 7-226935 | 8/1995 |
| JP | 8-331560 | 12/1996 |
| JP | 9-74557 | 3/1997 |
| JP | 9-139912 | 5/1997 |
| WO | WO 94/24822 | 10/1994 |

* cited by examiner

APPARATUS AND METHOD FOR ENCODING IMAGES AND MEDIUM IN WHICH IMAGE ENCODING PROGRAM HAS BEEN RECORDED

This is a continuation of copending International Application PCT/JP97/01266 having an international filing date of Apr. 11, 1997.

TECHNICAL FIELD

The present invention relates to an apparatus and method for encoding images and a medium in which an image encoding program has been recorded, and more particularly, is applicable to the case of transmitting images upon compression coded to an image decoding apparatus.

BACKGROUNDS ARTS

In the communication system for transmitting the image data coded and compressed at an image encoding apparatus and for expanding and decoding the transmitted image data at an image decoding apparatus, and in the compressed image recording and reproducing apparatus for recording an image data compressed and for outputting the compressed image data after expanding at the time of reproduction, the bidirectionally predictive coding system adopted by the MPEG (Moving Picture Experts Group) standard has been used as the method to compress the image data for example. In this bidirectionally predictive coding system, the efficiency of coding has been improved by using bidirectional prediction. In the bidirectionally predictive coding system, three types of coding, intra frame coding, interframe directionally predictive coding and bidirectionally predictive coding, are conducted and images according to each coding type are called as I picture (intra-coded picture), P picture (predictive coded picture) and B picture (bidirectionally predictive coded picture) respectively.

However, in the image encoding apparatus for compressing and coding the image data in utilizing the bidirectionally predictive coding system adopted by the MPEG standard, a buffer for verifying the decoding that the input buffer of image decoding apparatus is considered at the side of image encoding apparatus virtually, that is VBV (Video Buffering Verifier) buffer, is assumed in order to prove that the capacity of an input buffer possessed by the image decoding apparatus for expanding the compressed and coded image data would not be destroyed, and the volume of data to be generated in the image encoding apparatus is controlled not to overflow or underflow the permissible limits of the data occupancy rate of the VBV buffer (refer to "Multimedia, by Television Academic Association MPEG", p.115, published by Ohm-sha).

More specifically, in the case where the coded data is transmitted at the fixed bit rate from the image encoding apparatus, as shown in FIG. 1, the image data is generated from the VBV buffer in a state where the data occupancy rate of the VBV buffer would not underflow or overflow when the bit stream of the image data is inputted in the VBV buffer at the specified bit rate.

In the image decoding apparatus, the bit stream transmitted from the image encoding apparatus is decoded for each image data of one frame as an unit via the VBV buffer. Thereby, even if the bit rate of the coded data transmitted from the image data encoding apparatus is constant, a picture each having a different data size can be decoded surely. For example, the frame coded using the intra frame image data (that is, intra-coded I picture) has larger volume of codes per frame as compared with the frame coded using motion compensation from temporally preceding and succeeding frames. However, each picture can be surely decoded if the decoding is performed without the VBV buffer underflow or overflow.

In FIG. 1, the slope of each line segment x shows the fixed bit rate of data stream to be transmitted, and each position $x_1$ of each line segment x shows the data occupancy rate in the VBV buffer. Also, the line segment y shows a state in which one frame of data is read out from the VBV buffer as I picture, B picture, and P picture so that the data occupancy rate of VBV buffer is rapidly reduced.

However, as shown in FIG. 2, when the picture having data exceeding the amount of predetermined data occupancy rate appears from the VBV buffer, underflow occurs in the VBV buffer. This means that the image can not be decoded because of shortage of the data to decode the picture (the part under "0" in the figure) when more volumes of codes than the target code generation volume are generated due to complexity of image or vigorous movement although the target code generation volume is set according to the rate control.

The function of this VBV buffer is described in Annex C of the ISO (International Organization for Standardization)/IEC (International Electrotechnical Commission) 13818-2 (Video part of MPEG2). However, as to the function of the image decoding apparatus when underflow and over flow occur in the VBV buffer, it has not been described.

As a method for preventing the occurrence of underflow in the VBV buffer, a method to prevent the occurrence of underflow in the VBV buffer by setting the fixed threshold value to the VBV buffer and by skipping (stopping the encoding processing for the image) pictures when the data occupancy rate in the VBV buffer is under the threshold value, is proposed.

However, this method raises the possibility of conducting the skip processing on any image coding type of pictures. In this case, since the volume of codes to be generated (i.e., data rate) of I picture, which includes the most important image data in a picture quality in case of decoding, is larger than P picture and B picture, it is considered that I picture would be skipped more than P picture and B picture. Accordingly, in the case where I picture is skipped, it exerts an effect upon the quality of image of P picture and B picture which are predictive images of I picture and there was the possibility of degrading the overall picture quality.

DISCLOSER OF INVENTION

The present invention has been done considering the above point and is proposing an image encoding apparatus and an image encoding method capable of preventing underflow in the buffer for verifying decoding without degrading the picture quality.

To solve the above point, in this invention, the coding control means calculates the code generation volume of image coded. In accordance with the calculated result, the coding control means controls the coding means so that the coding processing for the first, second, or third image which is currently coded is stopped, in the case where the data occupancy rate of the image coded in the buffer of the image decoding apparatus is smaller than the first, second or the third threshold value corresponding to the first, second, or the third image currently coded from among the first, second and/or the third threshold values set corresponding to the first image to be intra-coded, the second image to be directionally predictive coded and the third image to be bidirectionally predictive coded.

Also, in the case where the coding process to the first image, the second image or the third image being coded is stopped, the buffer size for the following image is secured in the buffer of the image decoding apparatus.

Moreover, by setting the first, second and/or third threshold values according to the importance of image coding types in case of decoding the image, the buffer size of image with higher importance is be secured preferentially in the buffer of the image decoding apparatus.

In this way, the image encoding apparatus and the image encoding method which can prevent the occurrence of underflow in the buffer of image decoding apparatus can be realized without degrading the picture quality.

Further, coding means compresses and codes an input image data per picture by coding method corresponding to image coding types, and occupancy rate calculating means calculates data occupancy rate of the virtual buffer corresponding to the input buffer in the image decoding apparatus. Coding difficulty calculating means calculates the degree of coding difficulty showing the degree of coding difficulty of the picture succeeding the picture coded, and picture skip controlling means codes a picture to be coded next as the picture being formed by skip macro blocks in the case that the data occupancy rate to be calculated by the occupancy rate calculating means is lower than the specified data occupancy rate judging threshold value and the degree of coding difficulty to be calculated by the coding difficulty calculating means agrees with the specified standard, when coding of one picture is finished In this way, this invention can obtain the effect of avoiding the underflow of the virtual buffer corresponding to the input buffer in the image decoding apparatus by controlling the influence on the picture quality as small as possible.

BEST MODE FOR CARRYING OUT THE INVENTION (1) First embodiment

Figure 1:
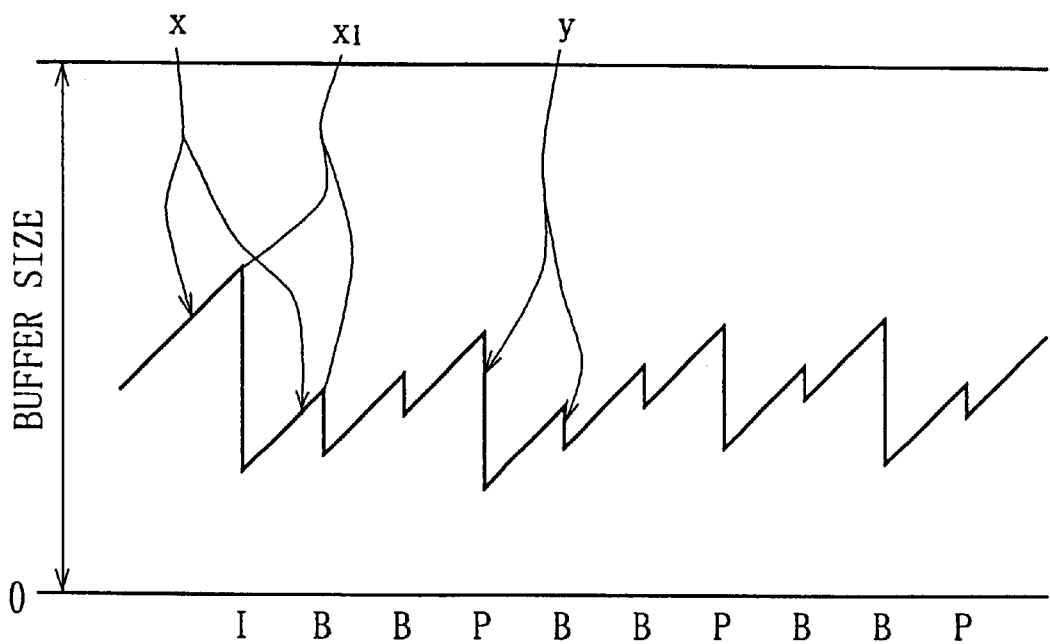
FIG. 1 is a schematic diagram explaining the transition of the data occupancy rate in a VBV buffer.
Figure 2:
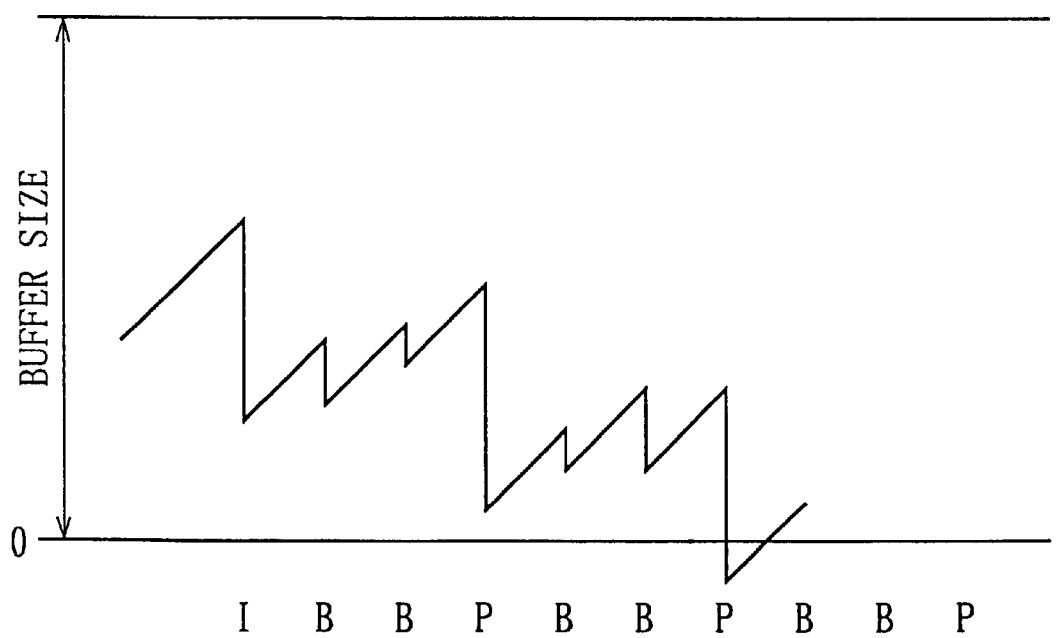
FIG. 2 is a schematic diagram explaining the underflow in the VBV buffer.
Figure 3:
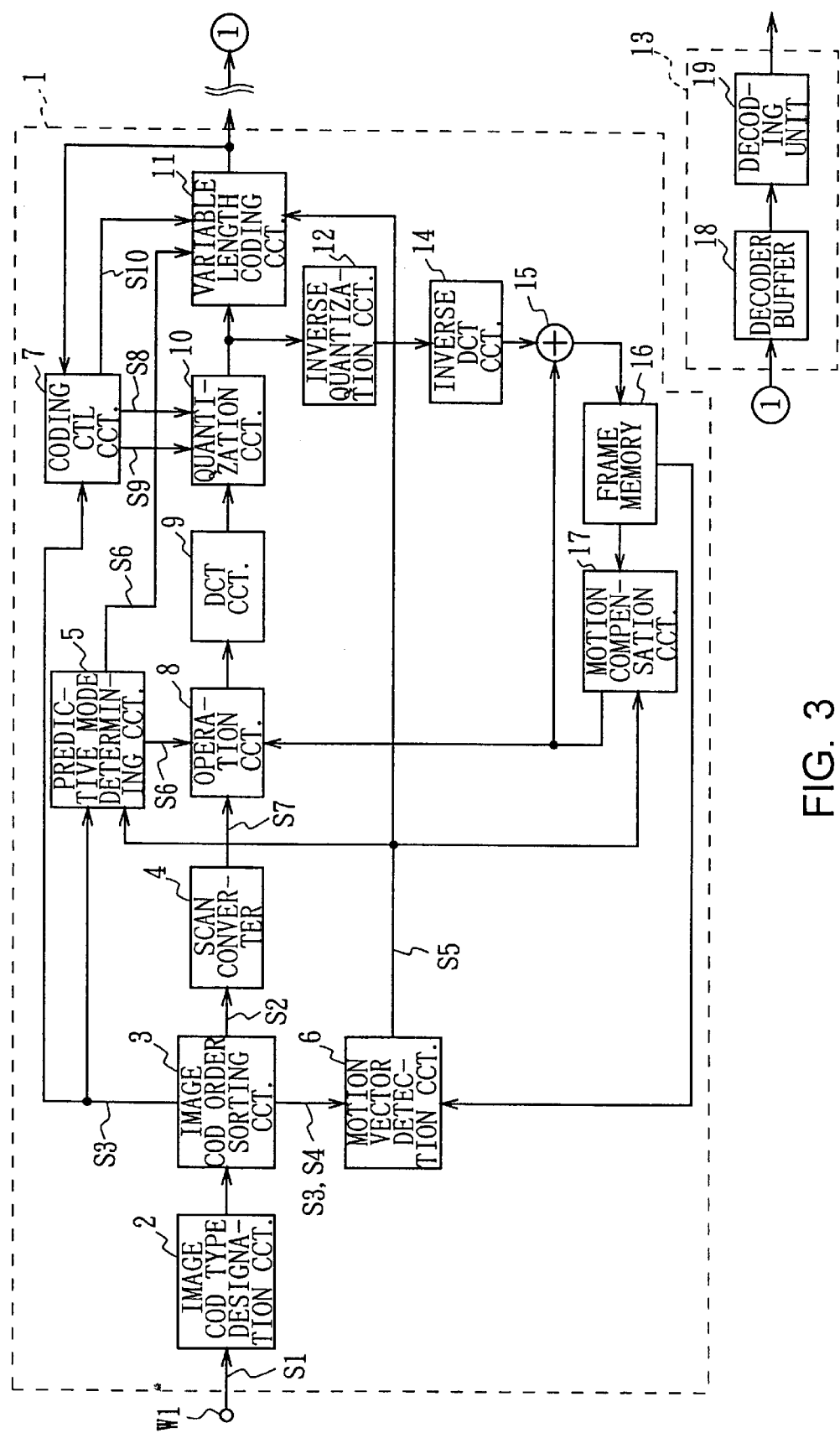
FIG. 3 is a block diagram showing the general construction of an image encoding apparatus according to the first embodiment of the present invention.

In FIG. 3, 1 represents an image encoding apparatus as a whole, and an input image signal S1 entered from an input terminal W1 is fed to an image type designation circuit 2.

The image type assigning circuit 2 assigns each frame of image signal S1 to be supplied would be processed as which image coding type picture from among I picture, B picture or B picture and outputs to an image coding order sorting circuit 3. This image encoding apparatus 1 makes fifteen frames as a group of pictures (GOP) making an unit of processing, for example.

The image coding order sorting circuit 3, as well as sorting each frame according to the designated image coding type in order of coding and sending out to a scan converter 4 as an image signal S2, outputs image coding type data S3 to a predictive mode determining circuit 5, a motion vector detection circuit 6 and a coding control circuit 7. Furthermore, in order to detect the motion vector of the frame currently being coded, the image coding order sorting circuit 3 outputs the current image, the image existing in the past than the current image (hereinafter referred to as a past reference image) and/or the image existing in future than the current image (hereinafter referred to as a future reference image) S4 to the motion vector detection circuit 6.

The scan converter 4 converts the frame to be supplied to block format signal and divides one frame of the signal into N numbers of slices making sixteen lines as a unit. Each slice is divided into N numbers of macro blocks formed by luminance signal corresponding to 16 by 16 pixels. Address (variable length code (increment value)) is added to each macro block and this address shows the position of each macro block. In this case, the address of macro block to be transmitted at first in the pictures shows the number, and the address of the following macro block shows the difference between the absolute address of said macro block and the absolute address of the macro block transmitted one block before.

The motion vector detection circuit 6 processes image data of each frame as I picture by the intra frame coding, P picture by the interframe directionally predictive coding or B picture by the bidirectional predictive coding according to the image coding type data S3 synchronized with each frame of the image signal S2. In this way, the image data of a frame to be processed as I picture is stored in the past reference image memory (not shown in figure) to store the past reference image, the image data of the frame to be processed as B picture is stored in a current image memory (not shown in figure) to store the current image, and the image data of the frame to be processed as P picture is stored in the future reference image memory (not shown in figure) to store the future reference image from the motion vector detection circuit 6.

Then, at the time when the frame to be processed as B picture or P picture is inputted to the motion vector detection circuit 6, the first P picture image data stored in the future reference image memory is stored in the past reference image memory. Then, the next B picture image data is stored in the current image memory and the following P picture image data is stored in the future reference image memory. From then on these operations will be repeated successively.

The motion vector detection circuit 6 outputs the motion vector in directional prediction and the motion vector data S5 being the motion vector estimated residue at that time to the predictive mode determining circuit 5. Further, the motion vector detection circuit 6 outputs the motion vector in the reverse directional prediction and the motion vector data S5 being the motion vector estimated residue at that time.

The predictive mode determining circuit 5 determines which predictive mode to determine from among intramode, forward directionally predictive mode, reverse directionally predictive mode, or bidirectionally predictive mode.

Here, the intra-mode is a processing to transmit the image data of the frame to be coded as the transmission data as it is, and the forward directionally predictive mode is a processing to transmit the predictive residue of the past reference image and the forward directional motion vector. Moreover, the reverse directionally predictive mode is a processing to transmit the predictive residue of the future reference image and reverse directional motion vector, and the bidirectionally predictive mode is a processing to transmit the predictive residue of the average value of two predictive images of past reference image and future reference image and to transmit two motion vectors in the forward direction and the opposite direction. In the case of B picture, these four kinds of predictive modes are shifted per macro block.

The predictive mode determining circuit 5 selects intra-mode in case of I picture based on the image coding type data S3 to be outputted from the image coding order sorting circuit 3, and in case of P picture, selects either intra-mode or forward directionally predictive mode, and in case of B picture, selects one of predictive modes from among intra-mode, forward directionally predictive mode, reverse directionally predictive mode or bidirectionally predictive mode, and sends out the predictive mode data S6 representing the selected predictive mode to an operation circuit 8.

The operation circuit 8 conducts the intra, directionally predictive, reverse directionally predictive or bidirectionally predictive calculations on the macro block S7 read out from the scan converter 4 based on the predictive mode data S6.

In the case where image data of the frame to be processed is input as I picture as macro block S7, the operation circuit 8 outputs the image data to a DCT (Discrete Cosine Transform) circuit 9 after intra-coding the image data. The DCT circuit 9 transforms the intra-coded image data to DCT coefficient and sends out to a quantization circuit 10.

The quantization circuit 10, after quantizing each DCT coefficient by the quantization step designated from the coding control circuit 7, sends out to a variable length coding circuit 11 and an inverse quantization circuit 12.

The variable length coding circuit 11, after transforming the image data quantized, predictive mode data S6 to be outputted from the predictive mode determining circuit 5 and motion vector data S5 to be outputted from the motion vector detection circuit 6 to variable length codes such as Huffman code, transmits it to an image decoding apparatus 13 through the transmission path (not shown), and outputs it to the coding control circuit. Also the variable length coding circuit 11 counts the increment value of each macro block.

The inverse quantization circuit 12, after inverse quantizing the image data quantized according to the quantization step at the time of quantization, outputs this to an inverse DCT circuit 14. The inverse DCT circuit 14 inverse DCT processes the output from the inverse quantization circuit 12. The output from the inverse DCT circuit 14 is stored in the past reference image memory unit (not shown) which stores past reference images in the frame memory 16 through a calculator 15.

Then, the image data of the frame to be processed as P picture is supplied from the scan converter 4 to the operation circuit 8. In the case where the predictive mode data S6 to be outputted from the predictive mode determining circuit 5 is intra-mode, the image data of the frame is intra-coded just as in the case of I picture described above and as well as being transmitted to the image decoding apparatus 13 and the coding control circuit 7 through the quantization circuit 10 and the variable length coding circuit 11, and further the image data of the frame is stored in a future reference image memory unit (not shown) for storing future reference images in the frame memory 16 through the inverse quantization circuit 12, the inverse DCT circuit 14 and the calculator 15.

In the case where the predictive mode data S6 represents the forward directionally predictive mode, an image data stored in the past reference image memory unit of the frame memory 16 (in this case, the image data of I picture) is read out and outputted to a motion compensation circuit 17.

The motion compensation circuit 17 motion compensates this image data in response to the forward directional motion vector data S5 to be outputted from the motion vector detection circuit 6.

More specifically, in the case of forward directionally predictive mode, the motion compensation circuit 17 reads out the data shifting the read address of the past reference image memory unit of the frame memory 16 for the portion corresponding to the forward directional motion vector data S5 from the position corresponding to the macro-block position to which the motion vector detection circuit 6 is presently outputting and forms predictive reference image and then outputs to the operation circuit 8 and the calculator 15.

The operation circuit 8 obtains differential data by subtracting the image data of predictive reference image corresponding to the macro block outputted from the motion compensation circuit 17 from the data S7 of macro block of the reference image to be outputted from the scan converter 4 and outputs this differential data to the DCT circuit 9.

This differential data is transmitted to the image decoding apparatus 13 and the coding control circuit 7 through the DCT circuit 9, the quantization circuit 10 and the variable length coding circuit 11. Moreover, this differential data is locally decoded by the inverse quantization circuit 12 and the inverse DCT circuit 14 and sent out to the calculator 15.

The calculator 15 adds the image data of predictive reference image to be outputted from the motion compensation circuit 17 to the differential data to be outputted from the inverse DCT circuit 14. Thus, the image data of P picture locally decoded can be obtained. This image data of P picture is stored in the future reference image memory unit for storing future reference images in the frame memory 16.

Then, the image data of the frame to be processed as B picture is supplied from the scan converter 4 to the operation circuit 8. In the case where the predictive mode data S6 to be sent out from the predictive mode determining circuit 5 is intra-mode or forward directionally predictive mode, the image data of the frame is processed just as in the case of P picture described above. On the other hand, if the predictive mode data S6 is set in the opposite directionally predictive mode, an image data stored in the future reference image memory unit of the frame memory 16 (in this case the image data of P picture) is read and sent out to the motion compensation circuit 17.

The motion compensation circuit 17 motion compensates this image data in response to the inverse directional motion vector data S5 to be sent out from the motion vector detection circuit 6.

More specifically, in the inverse directionally predictive mode, the motion compensation circuit 17 reads out the data shifting the read address of the future reference image memory unit of the frame memory from the position corresponding to the position of macro block to which the motion vector detection circuit 6 is currently outputting for the portion corresponding to the motion vector data S5 and forms predictive reference image, and sends this out to the operation circuit 8 and the calculator 15.

The operation circuit 8 obtains the differential data as a predictive residue by subtracting the image data of predictive reference image corresponding to the macro block sent out from the motion compensation circuit 17, from the data of macro block of reference image to be sent out from the scan converter 4 and sends this data out to the DCT circuit 9. This differential data is transmitted to the DCT circuit 9.

At this time, the calculator 15 adds the image data of predictive reference image to be outputted from the motion compensation circuit 17 to the differential data to be outputted from the inverse DCT circuit 14. Thus, the image data of B picture which is locally decoded can be obtained.

In the case of bidirectionally predictive mode, the image data stored in the past reference image memory unit of the frame memory 16 (in this case the image data of I picture) and the image data stored in the future reference image memory unit (in this case the image data of P picture) are read and sent out to the motion compensation circuit 17.

The motion compensation circuit 17 motion compensates this image data in responding to the motion vector data S5 being the forward directional motion vector and the opposite directional motion vector to be sent out from the motion vector detection circuit 6.

More specifically, in the case of bidirectionally predictive mode, the motion compensation circuit 17 reads the data shifting the read address of the past reference image memory unit and the future reference image memory unit of the frame memory 16 from the position corresponding to the position to which the motion vector detection circuit 6 is currently outputting the macro block for the portion corresponding to the motion vector data S5 being the forward directional motion vector and the opposite directional motion vector, and forms the predictive reference image which will be sent out to the calculation circuit 8 and the calculator 15.

The calculation circuit 8 obtains the differential data by subtracting the average value of image data of the predictive reference image corresponding to the macro block outputted from the motion compensation circuit 17 from the macro block data of reference image to be outputted from the scan converter 4 as a predictive residue, and sends this differential data out to the DCT circuit 9.

At this time, the calculator 15 adds the image data of predictive reference image to be outputted from the motion compensation circuit 17 to the differential data to be outputted from the inverse DCT circuit 14. Thus, the image data of locally decoded B picture will be obtained. At this point, since B picture is not used as a predictive image of the other image, it is not stored in the frame memory 16.

The image decoding apparatus 13, after storing the bit stream to be transmitted with a fixed bit rate from the image encoding apparatus 1 once in a decoder buffer 18, reads one frame of image data out from the decoder buffer 18 at the fixed timing and successively decodes at the decoding unit 19. The decoded frames is arranged in the order of original images to be displayed such as on the display.

Here, the decoder buffer 18 constitutes the buffer for assuring decoding (that is, a VBV buffer) which is virtually considered from the image encoding apparatus 1, and the image encoding apparatus 1 is so designed to know the timing for the decoding unit 19 reads the image data from the decoder buffer 18.

In the case of this embodiment, the coding control circuit 7 calculates the volume of codes generated of the variable length coded image data to be outputted from the variable length coding circuit 11 per macro block, and counts the increment values. Moreover, the coding control circuit 7 sends quantization step control signal S8 representing the target code generation volume out to the quantization circuit 10 and controls the volume of code generation per one frame.

Furthermore, the coding control circuit 7 holds the third threshold value, the second threshold value and the first threshold value as the threshold value of the data occupancy rate in the decoder buffer which functions as the VBV buffer 18. These third, second and first threshold values correspond respectively to B picture, P picture and I picture. Also, the values of these thresholds are set to become higher in order of less importance of the image coding types when coding images; the third threshold value>the second threshold value>the first threshold value. In this way, when the B picture is being coded, if image data whose data occupancy rate in the decoder buffer 18 is smaller than the third threshold value is generated based on the code generation volume of the image data to be outputted from the variable length coding circuit 11, the coding control circuit 7 outputs a skip execution signal S9 and skips the image data after the B picture being coded per macro block. Therefore, the decline of the data occupancy rate is suppressed.

Here, the skipping is to stop the coding processing which is currently performing.

Figure 4:
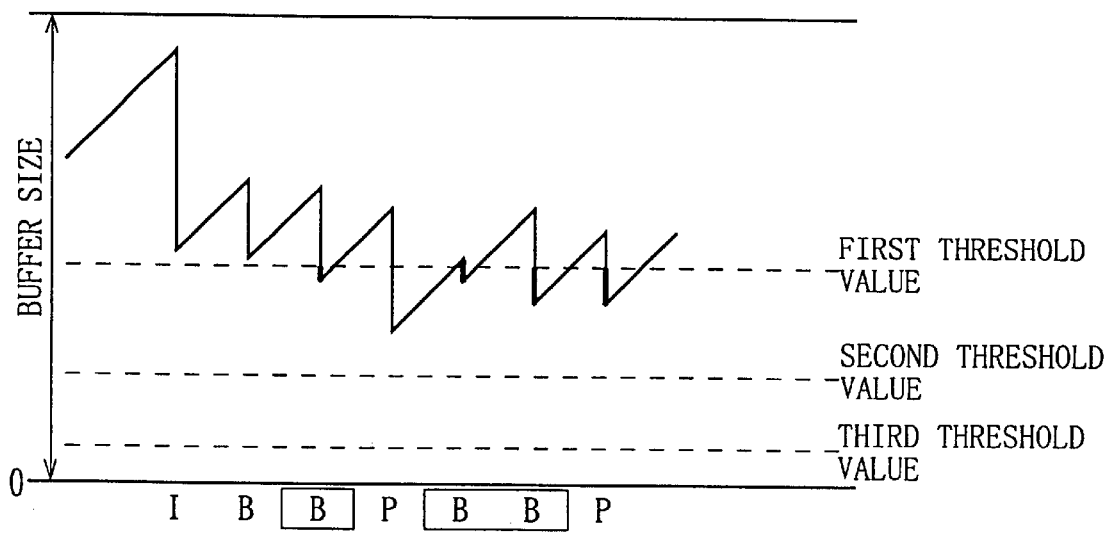
FIG. 4 is a schematic diagram explaining the transition of the data occupancy rate when the volume of data occupancy in the VBV buffer is lower than the first threshold value.

When the image data is processed as described above, the data occupancy rates in the VBV buffer 18 composed of the data buffer 18 changes as shown in FIG. 4. The heavy line parts shown in FIG. 4 show that the image data are skipped, and the same applies to FIG. 5 and FIG. 6.

In this case, when the quantization circuit 10 receives the skip signal S9, it turns ON a skip switch which is installed inside and skips the image data. In this case, the coding control circuit 7 sends out the address information S10 on macro blocks to be skipped to the variable length coding circuit 11. Codes (bits) are no longer produced from the quantization circuit 10. Moreover, when the quantization circuit 10 does not skip image data, it turns OFF the skip switch and quantizes the image data.

At this point, the coding control circuit 7 knows the timing that the decoding unit 19 of the image decoding apparatus 13 reads out the data from the decoder buffer 18 and moreover, since it calculates the volume of codes generated of image data to be outputted from the variable length coding circuit 11, it can find the data volume currently stored in the decoder buffer 18.

In the case where the image data has not been skipped, the variable length coding circuit 11, as well as counting the increment value, transmits the image data to the coding control circuit 7 and the image decoding apparatus 13 with the address information. On the other hand, if the image data has been skipped, the variable length coding circuit 11 counts the increment value but not outputting the address information on macro blocks skipped, conducts the variable length coding on the address information of the first macro block in line direction (hereinafter referred to as the top address information) of multiple macro blocks aligned vertically and horizontally and the address information of the last macro block in line direction (hereinafter referred to as the last address information) and transmits to the coding control circuit 7 and the image decoding apparatus 13.

Thus, the coding control circuit 7 and the image decoding apparatus 13 can find which image coding type of image data is skipped. Here, designations of the top address information and the last address information to the variable length coding circuit 11 will be conducted by the coding control circuit 7 outputting the designation signal S10 to the variable length coding circuit 11.

Furthermore, when the P picture is being coded in the case where the image data having lower data occupancy rate than the second threshold value in the decoder buffer 18 is generated, the coding control circuit 7 sends the skip execution signal S9 to the quantization circuit 10 and skips the image data thereafter in the P picture being coded per macro block.

Figure 5:
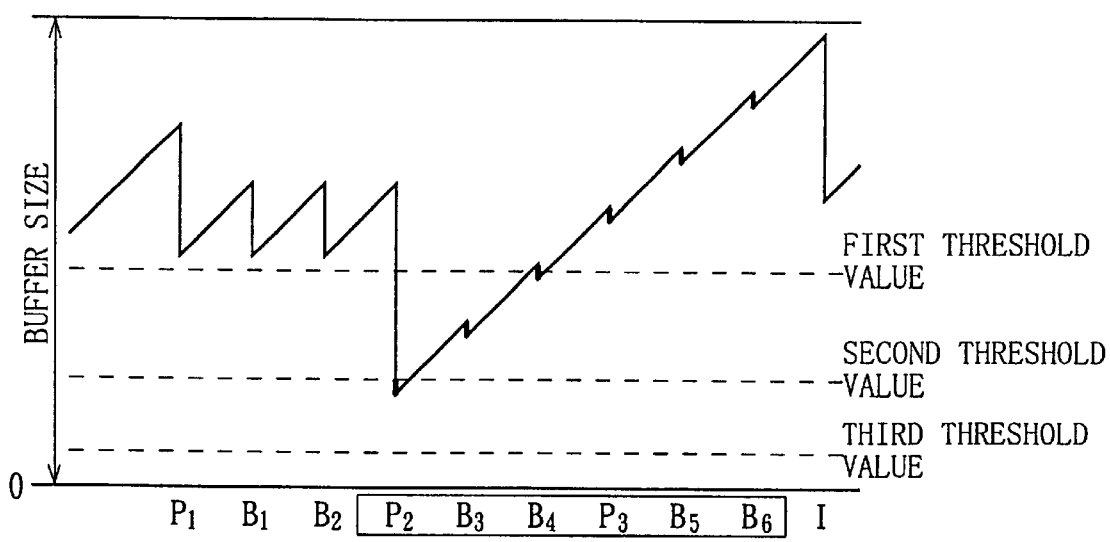
FIG. 5 is a schematic diagram explaining the transition of the data occupancy rate when the volume of data occupancy in the VBV buffer is lower than the second threshold value.

In the case where the P picture is skipped, the coding control circuit 7 skips all B pictures and P pictures using the skipped P pictures as predictive images in case of decoding even when the data occupancy rate in the decoder buffer 18 exceed the corresponding threshold values respectively. This is because, as shown in FIG. 5, the P picture $P_3$ makes the preceding P picture $P_2$ as a predictive image. More specifically, since the P picture $P_2$ is skipped midway through coding, it becomes insufficient as the image data and thus causes degrading in the picture quality of decoded P picture $P_3$ to be decoded in utilizing this P picture $P_2$. The same can be applied to the B picture $B_5$ and B picture $B_6$. Accordingly, the image data up to the next I picture coding are skipped.

Furthermore, as shown in FIG. 5, the data volume is decreased for the heavy line portion even though B picture $B_3$, B picture $P_4$, P picture $P_3$, B picture $B_5$ and B picture $B_6$ are skipped respectively. The reason is that the top address information and the last address information are read out. The same applies to FIG. 6.

Moreover, when the I picture is being coded, in the case where image data having the code volume of buffer occupancy rate lower than the third threshold value in the decoder buffer 18 is generated, the coding control circuit 7 outputs skip execution signal S9 to the quantization circuit 10 and codes the image data from then on of I picture being coded per macro block as macro block containing only DC element. In this case, the coding control circuit 7 controls the quantization circuit 10 to skip B pictures and P pictures till the next I picture is coded.

Figure 6:
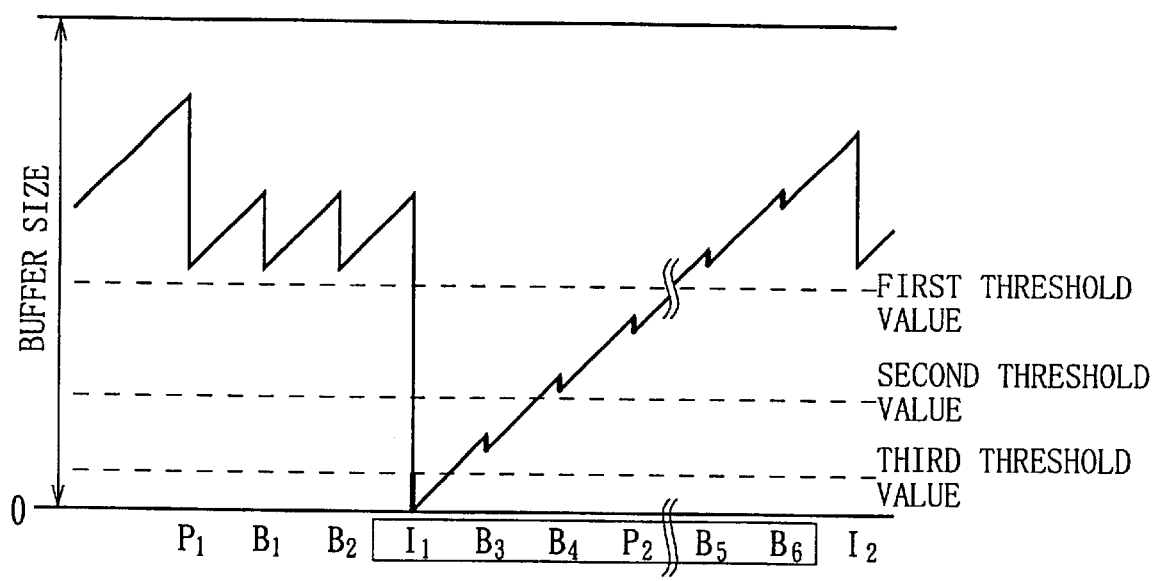
FIG. 6 is a schematic diagram explaining the transition of the data occupancy rate when the volume of data occupancy in the VBV buffer is lower than the third threshold value.

As shown in FIG. 6, this is because P picture $P_2$ makes the preceding I picture $I_1$ as the predictive image for example. More specifically, because only DC element of the I picture $I_1$ will be coded midway through the coding, it becomes insufficient as the image data and thus causes degrading in the picture quality of after decoded P picture $P_2$ to be decoded in utilizing this I picture $I_1$. The same applies to B picture $B_3$, B picture $P_4$, B picture $P_5$ and B picture $B_6$ which utilize I picture $I_1$ and P picture $P_2$ in case of decoding. Accordingly, the image data is skipped till the next I picture is coded.

As a result, the heavy lines shown in FIGS. 4 to 6 will be formed by macro blocks skipped or intra macro blocks having only DC elements.

Furthermore, in the case where the image data is skipped as described above, the coding control circuit 7 controls the quantization circuit 10 by means of the target code generation volume control signal S8 in order to allocate more target code generation volumes to the image data from then on for the same volume skipped. In this case, the coding control circuit 7 allocates more target code generation volumes in order of importance in case of decoding images, such as in order of I picture and P picture the more target code generation volumes are to be allocated.

In the case where pictures are skipped in the image encoding apparatus 1, the image decoding apparatus 13 can judge which macro block is skipped based on the address information to be transmitted, and thereby when the macro block is skipped, the preceding frame will be displayed as it is.

Figure 7:
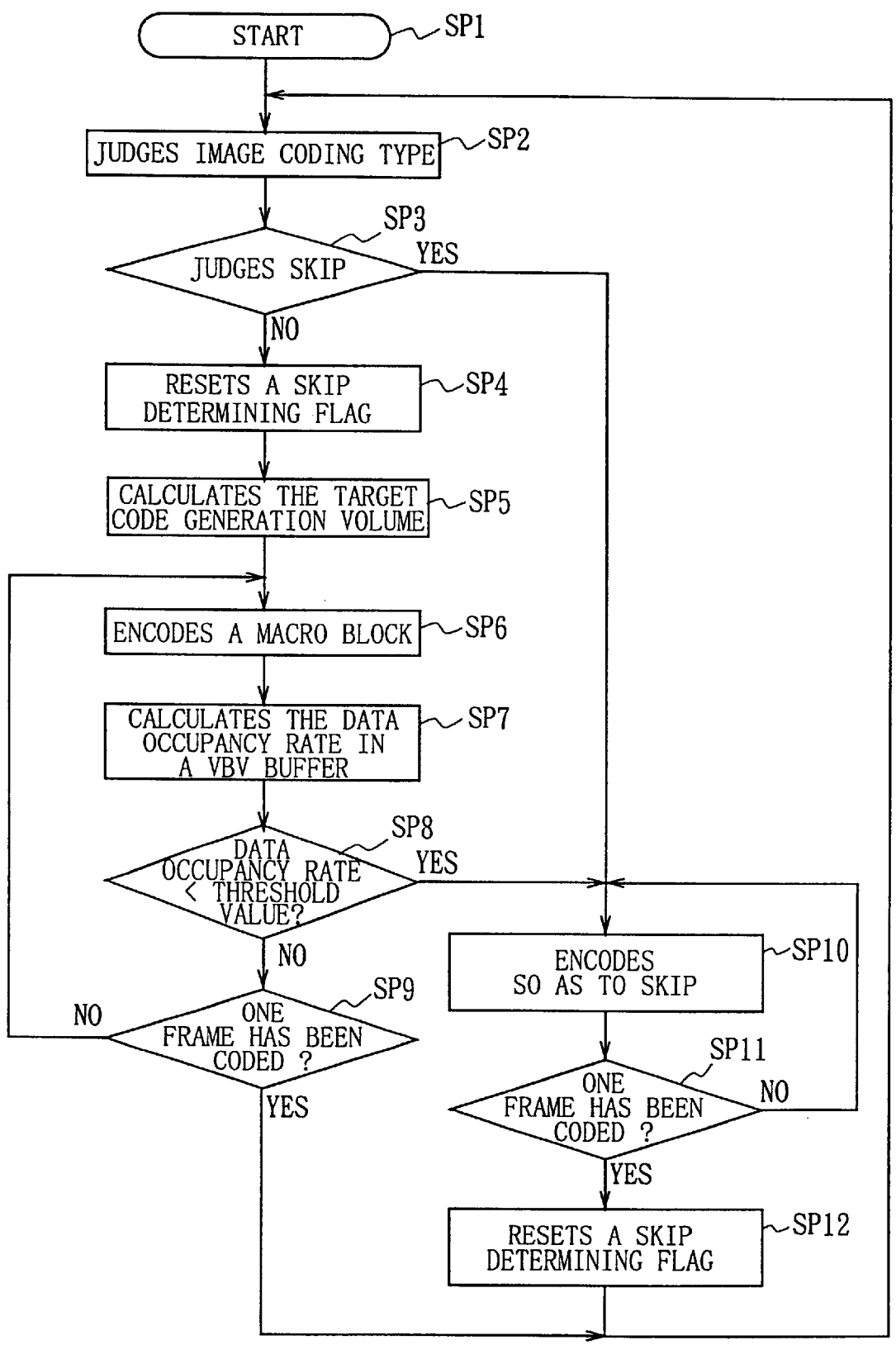
FIG. 7 is a flow chart explaining the function of a coding control circuit.

The function of the coding control circuit 7 will be described with reference to FIG. 7.

The coding control circuit 7 starts its operation from the step SP1 and at the step SP2, and after judging that the picture to be coded from now on (hereinafter referred to as a coding target picture) belongs to which image coding type based on the image coding type S3 to be sent from the image coding sorting circuit 3, proceeds to the step SP3.

The coding control circuit 7 judges whether to skip the coding target picture or not based on the image coding type of picture on which skip determining flag is set (hereinafter referred to as skip picture) and the image coding type of the coding target picture. Here, the skip determining flag which will be described later, shows the flag to be set to the skip picture.

The reason of judging whether to skip the coding target picture or not at this step SP3 is to determine whether the skip picture is predictive image of the coding target picture or not. More specifically, as described above, since in the case where the predictive image of the coding target picture is skipped, this gives an effect on the picture quality of the picture to be decoded using this predictive image, and it is necessary to skip this even in the case where the data occupancy rate in the decoder buffer 18 is not smaller than the threshold value corresponding to the image coding type of the coding target picture when coding the coding target picture. For example, supposing that P picture $P_3$ (FIG. 5) is a coding target picture, P picture $P_2$ which becomes a predictive image of said P picture $P_3$ is skipped.

At the step SP3, if the coding control circuit obtains a negative result, proceeding to the step SP4 resets a skip determining flag. The reason of resetting the skip determining flag at this point is to avoid the image data of the picture which should not be skipped from being skipped.

Then, the coding control circuit 7 after calculating the target code generation volume at the step SP5, proceeds to the step SP6 encodes the coding target picture per macro block. And then at the step SP7, calculating the current data occupancy rate in the decoder buffer 18, the coding control circuit 7 proceeds to the step SP8.

At the step SP8, the coding control circuit 7 judges whether the data occupancy rate in the decoder buffer 18 calculated at the step SP7 is smaller than the threshold value corresponding to the coding target picture or not, and if a negative result is obtained, the coding control circuit 7 proceeds to the step SP9. At the step SP9, the coding control circuit 7 judges whether one frame of coding target picture is coded or not, and if a negative result is obtained, returns to the step SP6 and executes the processing loop from the step SP6 to the step SP9.

When the coding control circuit 7 judges to skip the coding target picture at the step SP3, proceeds to the step SP10 and skips said coding target picture except the top address information and the final address information and in the case where the coding target picture is I picture, encodes this as a macro block with only DC elements. Moreover, in the case where the data occupancy volume in the decoder buffer 18 falls short of the threshold value corresponding to the coding target picture at the step SP8, the coding control circuit 7 skips the image data of the coding target picture thereafter per macro block.

Then, the coding control circuit 7 proceeds to the step SP11 and judges whether the coding has been conducted on one frame of coding target picture or not.

When the coding control circuit 7 obtains a negative result at the step SP11, returns to the step SP10 and executes the processing loop of step SP10 and step SP11. If an affirmative result is obtained, it proceeds to the step SP12. At the step SP12, after setting the corresponding skip determining flag to the skipped picture, the coding control circuit 7 returns to the step SP2 and repeats the aforementioned operations till the image signal would be all processed.

According to the foregoing construction, when B picture is being coded based on the code generation volume of the image data from the variable length coding circuit 11 in the image encoding apparatus 1, and if image data having the code volume of data occupancy rate in the decoder buffer 18 is smaller than the third threshold value occurs, the image data of B picture being coded will be skipped thereafter per macro block, and the buffer size for the image data of the next P picture can be secured in the decoder buffer 18.

Furthermore, in the image encoding apparatus 1, when P picture is being coded based on the code generation volume of the image data from the variable length coding circuit 11, and if an image data having the code volume of data occupancy rate in the decoder buffer 18 is smaller than the second threshold value, the image data of P picture being coded thereafter will be skipped, and the data occupancy rate of the VBV buffer for the image data of I picture would be secured in the decoder buffer 18.

Moreover, in the case where the P picture is skipped, P picture and B picture which make P picture as the predictive image would be all skipped, and thereby worsening of the picture quality can be prevented.

Furthermore, in the image encoding apparatus 1, when I picture is being coded based on the code generation volume of the image data from the variable length coding circuit 11, if an image data having the code volume of the data occupancy rate in the decoder buffer 18 is smaller than the first threshold value occurs, the image data of I picture being coded thereafter will be skipped per macro block and thereby the data occupancy rate of the VBV buffer for the image data of next I picture can be secured in the decoder buffer 18.

Moreover, if the I picture is skipped, all P pictures and B pictures will be skipped till I picture is coded and thus, worsening of the picture quality can be prevented.

Accordingly, in this image encoding apparatus 1, since the picture of image coding type having minor importance is skipped with preferential basis in case of decoding the image, the data occupancy rate of the VBV buffer for the picture of image coding type having higher importance can be secured in the decoder buffer 18.

Moreover, in the image encoding apparatus 1, since the picture of image coding type having minor importance is skipped with preferential basis in case of decoding, the picture of image coding type having higher importance in case of decoding can be allocated more target code generation volume by the volume skipped and thereby the worsening of the picture quality can be avoided. And it is especially effective when the picture pattern of the image is complicated.

Furthermore, the freeze condition of images of the image decoding apparatus 13 side can be controlled by the image encoding apparatus 1 side.

According to the foregoing construction, as well as setting the third threshold, the second threshold and the first threshold corresponding to B picture, P picture and I picture respectively as the threshold value of the data occupancy rate in the VBV buffer, the values of these third threshold, second threshold and first threshold are set in increasing order by the third, second and first threshold values, thereby the pictures of image coding type having higher importance in case of decoding the image will be preferentially skipped.

Thus, in the VBV buffer, the data occupancy rate of the picture of image coding type of high importance in case of decoding image can be secured preferentially. As a result, the image encoding apparatus 1 capable of surely avoiding the occurrence of under-flow in the VBV buffer without degrading the picture quality can be realized.

Furthermore, the first embodiment described above has dealt with the case of utilizing the Huffman code as a coding system in the variable length coding circuit 11. However, the present invention is not only limited to this but also various coding systems can be applied as the coding system in the variable length coding circuit 11.

Moreover, the first embodiment described above has dealt with the case of making, e.g., fifteen frames as a group of picture (GOP) and processing it as one unit. However, the present invention is not only limited to this but also the number of frames to form the GOP may be constructed by the other various numbers.

Furthermore, the first embodiment described above has dealt with the case of coding each image per frame. However, the present invention is not only limited to this but also coding may be conducted per field, or frame and field combined. It may be so arranged that it is compatible with the non-interlaced scanning system.

Furthermore, the first embodiment described above has dealt with the case of using the image coding sorting circuit 3 and the coding control circuit 7 as the image coding type judging means to judge the image coding type of the image which becomes the target of coding. However, the present invention is not only limited to this but also as the image coding type judging means various other image coding type judging means can be applied.

Moreover, the first embodiment described above has dealt with the case of using an image coding type designation circuit 2, an image coding order sorting circuit 3, a scan converter 4, a predictive mode determining circuit 5, a motion vector detection circuit 6, a coding control circuit 7, an operation circuit 8, a DCT circuit 9, a quantization circuit 10, a variable length coding circuit 11, an inverse quantization circuit 12, an inverse DCT circuit 14, a calculator 15, a frame memory 16 and a motion compensation circuit 17 as the coding means for coding the first, second and third images based on the output of the image coding type judging means. However, the present invention is not only limited to this but also various other first coding means can be applied as the coding means.

Furthermore, the first embodiment described above has dealt with the case of using the coding control circuit 7 as a coding control means for controlling the coding means to calculate the volume of codes generated of the coded image and based on this calculation result if the date occupancy rate of the coded data in the buffer of the image decoding apparatus is smaller than the first, second or third threshold value corresponding to the first, second or third image presently being coded from among the first, the second and the third threshold values of the data occupancy rate set corresponding to the first, the second and the third images respectively occurs, to stop the coding processing for the presently coded first, second or the third image. However, the present invention is not only limited to this but also various other coding control means can be applied as the coding control means.

Furthermore, the first embodiment described above has dealt with the case of coding the image data on the images of three coding types, that is, I picture, P picture, and B picture. However, the present invention is not only limited to this but the same effect as the first embodiment described above can be obtained also in the case where two coding types, that is, I picture and P picture, or I picture and B picture, are used to code the image from among three coding types.

In connection, as the threshold value of the data occupancy rate in the VBV buffer, as well as setting the first threshold value corresponding to I picture, the threshold value which is larger than the first threshold value is set as the second or third threshold value corresponding to P picture or B picture. Therefore, P picture or B picture having lower importance in decoding the image than I picture can be skipped preferentially.

Therefore, in the VBV buffer, the data occupancy rate of the picture of the image coding type having higher importance in decoding the image can be secured. As a result, the image encoding apparatus capable of surely avoiding the occurrence of underflow in the VBV buffer without degrading the image can be obtained.

(2) Second Embodiment

Figure 8:
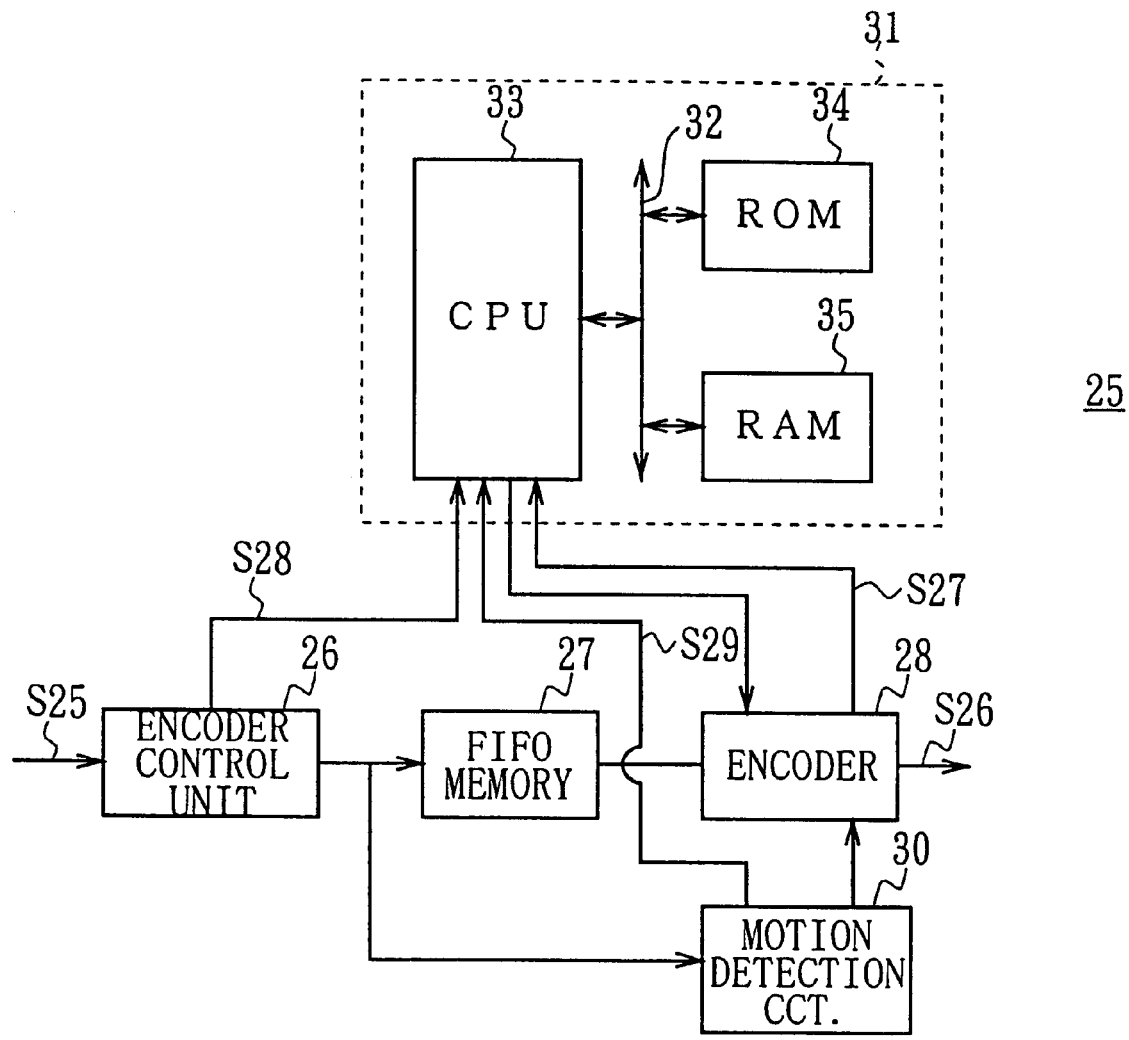
FIG. 8 is a block diagram showing the general construction of an image encoding apparatus according to the second embodiment of the present invention.

In FIG. 8, the image encoding apparatus 25 performs the processing such as a pre-processing for compress coding on an input image signal S25 at a encoder control unit 26, thereafter, delays the output data by the fixed time in a FIFO (first-in-first-out) memory 27. The output data of the FIFO memory 12 is compress coded by the coding method according to image coding types, that is, picture types for each picture by the encoder 28 being as a coding means, and then outputted as the compressed image data S26.

The motion vector detected based on the output data of the encoder control unit 11 is supplied to an encoder 28 by a motion detection circuit 14, and is controlled by a coding control unit 31 based on a generation bit rate data S27 to be outputted from the encoder 13, an intra AC data S28 to be outputted from the encoder control unit 26, and a ME residue data S29 to be outputted from the motion detection circuit 30.

The image encoding apparatus 25 shown in FIG. 8 is constructed to conduct the feed forward type rate control for controlling the volume of code generation based on the feature of pre-coding imaged data.

Here, the ME residue, to be brief, is a residue obtained by performing the absolute value summing or square summing of the motion predictive error over all pictures, and ME residue data S29 is the data for obtaining the ME residue.

The coding control unit 31 is formed by a computer comprising a CPU (central processing unit) 33, a ROM (read only memory) 34 and a RAM (random access memory) 35 which are connected each other via a bus 32. The CPU 33 uses the RAM 35 as a working area and executes the program stored in the ROM 34, so as to realize each function in the coding control unit 31. The ROM 34 is a memory in which image coding control program according to the present invention is stored, and IC (integrated circuit), or any memory device which use the magnetic disc such as hard disc, floppy disc as a recording medium, or any memory device which use the optical disc such as CD (compact disc)—ROM as a recording medium may be used for this memory device, or the memory device using any other types of recording media may be used. In any case, the IC and various other recording media correspond to the image coding control program-bearing medium according the present invention.

Figure 9:
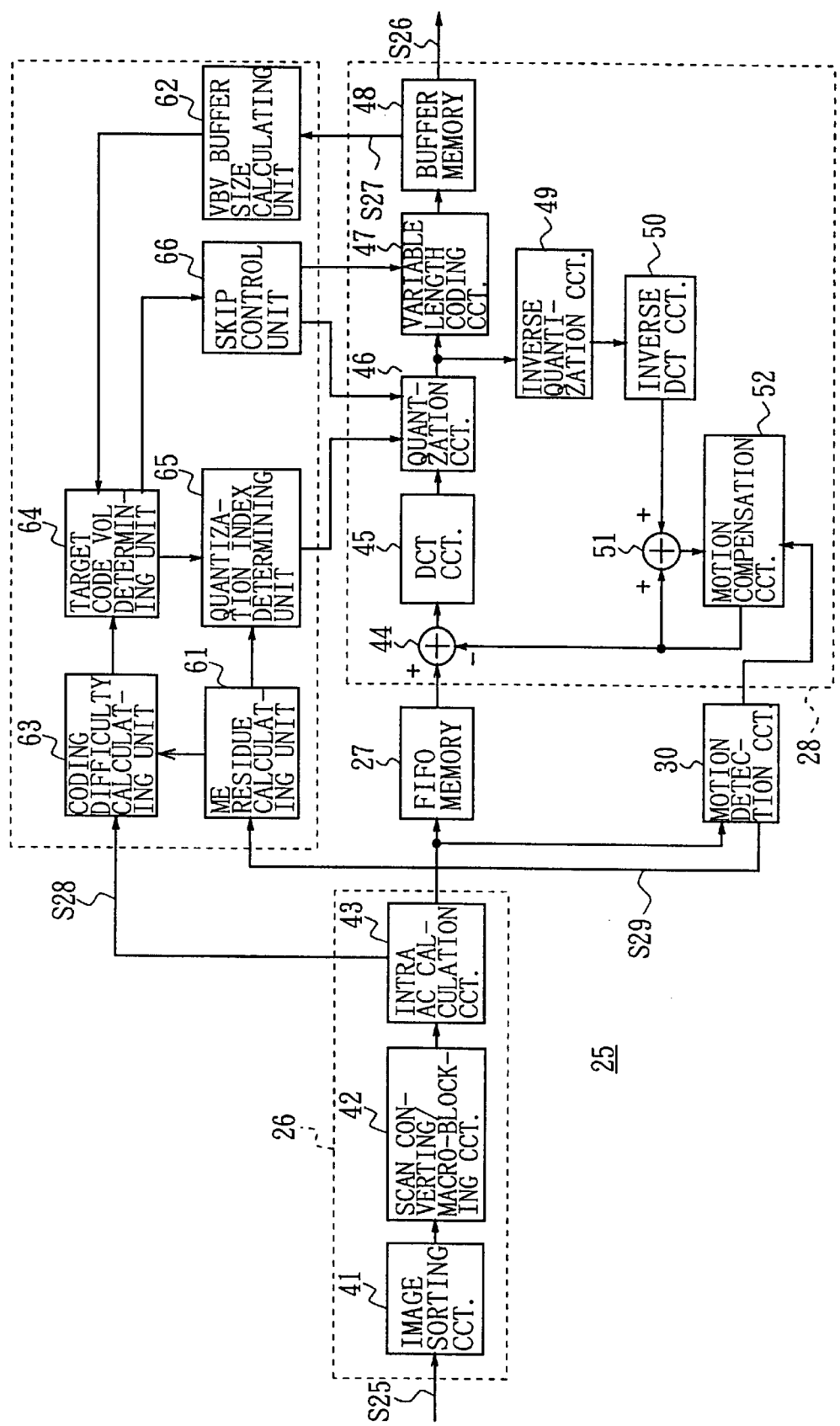
FIG. 9 is a block diagram showing the detailed construction of the image encoding apparatus in FIG. 8.

As shown in FIG. 9, the encoder control unit 26 comprises an image sorting circuit 41 which inputs an input image signal S25 and sorts the picture (I picture, P picture and B picture) in order of coding, a scan converting/macro-blocking circuit 42 which inputs an output data of this image sorting circuit 41, judges whether frame construction or field construction and scans converting and macro-blocking of sixteen by sixteen pixel, and an intra AC calculation circuit 43 which inputs the output data of this scan converting/macro blocking circuit 42, calculates the intra AC in the I picture, sends out the intra AC data S28 to the coding control unit 31, and sends out the output data of the scan converting/micro-blocking circuit 42 to the FIFO memory 27 and the motion detection circuit 30.

Here, the intra AC is defined as the sum of absolute values of the differential between the pixel value of each pixel in the DCT (discrete cosine transform) block of eight by eight pixel and the average value of pixel values in the DCT block, and it is showing the complexity of picture patterns.

An encoder 28 counts the difference between the output data of the FIFO memory 27 and the predictive image data in a subtracting circuit 44. A DCT circuit 45 conducts DCT on the output data of the subtracting circuit 44 for each DCT block, so as to output the DCT coefficient, and the output data of the DCT circuit 45 is quantized by a quantization circuit 46, and then, variable length coded by a variable length coding circuit 47. The output of this variable length coding circuit 47 is held once in a buffer memory 48 and outputted as compressed image data S26 formed by bit stream with the fixed bit rate.

The output data of the quantization circuit 46 is inverse quantized by an inverse quantization circuit 49, and an inverse DCT circuit 50 conducts the inverse DCT to the output data of this inverse quantization circuit 49. The output data of this inverse DCT circuit 50 is added with the predictive image data by an adding circuit 51, and the output data of this adding circuit 51 is held at a motion compensation circuit 52 where it performs the motion compensation on it in accordance with the motion vector to be supplied from the motion detection circuit 14. The predictive image data is outputted to the subtracting circuit 44 and the adding circuit 31.

The buffer memory 48 transmits the generation bit rate data S27 representing the bit rate generated from the variable length coding circuit 47 to the coding control unit 31.

The motion detection circuit 30, after searching for macro block of which the absolute value sum or the square sum of the difference of pixel values between the target macro block of the picture to be coded and the target macro block on the picture to be referred based on the output data of the encoder control unit 26 becomes the minimum, detects the motion vector and outputs to the motion compensation circuit 52. Moreover, in the event of obtaining the motion vector, the motion detection circuit 30 transmits the absolute value sum or the square sum of the difference of pixel values in macro blocks which become minimum as the ME residue data S29 to the coding control unit 31.

The coding control unit 31 calculates, at a ME residue calculating unit 61, the ME residue which is the value adding up the ME residue data S29 from the motion detection circuit 30 to the overall pictures. A coding difficulty calculating unit 42 calculates the coding difficulty to show the degree of difficulty in picture coding based on the ME residue calculated by the ME residue calculating unit 61 and the intra AC data S28 from the intra AC operation circuit 43. A VBV buffer size calculating unit 62 calculates the data occupancy rate in the VBV buffer which is a virtual buffer which corresponds to the input buffer in the image decoding apparatus to expand the image data compress coded by the image encoding apparatus 28 according to the second embodiment based on the generation bit rate data S27 from the buffer memory 48. The ME residue represents the movement speed of the image and the complexity of picture patterns.

The coding control unit 31 further comprises a target code volume determining unit 64 which judges whether or not to conduct skipping to stop the coding processing on the image in order to avoid the underflow in the VBV buffer, as well as determining the target code volume based on the degree of coding difficulty calculated by the coding difficulty calculating unit 63 and the VBV buffer size calculated by the VBV buffer size calculating unit 62. A quantization index determining unit 65 determines the quantization index corresponding to the quantization characteristic value in the quantization circuit 46 in order that the volume of codes generated in the encoder 28 becomes the target code volume determined by the target code volume determining unit 64, and sends it to the quantization circuit 46. In this way, a skip control unit 66 controls the quantization circuit 46 and the variable length coding circuit 47 to conduct skipping when it is judged that the target code volume determining unit 64 conducts skipping.

At this point, the coding difficulty will be described. The coding difficulty shows the degree of picture coding difficulty or put it another way, this can be translated to the ratio of data volumes necessary for maintaining the consistent picture quality. Various methods for converting the degree of coding difficulty into numbers can be considered, however, according to the second embodiment, the degree of coding difficulty on I picture will be obtained using the intra AC and the degrees of coding difficulties on P picture and B picture will be obtained using the ME residue. As described earlier, the intra AC shows the complexity of picture patterns and the ME residue shows the movement speed of the image and complexity of picture patterns and since these strongly correlate with the degree of coding difficulty, the degree of coding difficulty can be calculated from the intra AC and the ME residue by linear functions making the intra AC and the ME residue as variables.

Then, a method to determine the occurrence of risk of underflow in the VBV buffer will be described based on the degree of coding difficulty. As described earlier, underflow of the VBV buffer occurs at the time when the volume of generated codes far exceeds the target code volume. This means that when the coding difficulty of input image is very large with respect to the bit rate, underflow occurs. Thus, it is appropriate to use the ratio of coding difficulty to the bit rate as a parameter to judge the risk of underflow in the VBV buffer. Moreover, in order to judge the risk of underflow in the VBV buffer, it is important to see the ratio of coding difficulty to said bit rate within several numbers of predictive pictures to be coded. This is because the coding difficulty degree changes according to picture types. Accordingly, in the second embodiment the parameter x to be defined by the following equation will be used as the parameter to judge the risk of underflow of the VBV buffer.

$$x = \Sigma D_k / G \quad (1)$$

Here, $D_k$ shows the degree of coding difficulty of picture k, and K show the coding order of pictures and the picture to be coded next is k=1. $\Sigma$ means the sum from k=1 to N (N is the number of pictures for 1 GOP (group of picture). Also, G is defined by the following equation:

$$G = ([\text{bit rate}] \times N) / [\text{picture rate}] \quad (2)$$

In the equation (2), [bit rate] shows the data rate [bit rate] per second to be determined based on the transmission capacity of the communication circuit or the recording capacity of the recording medium, and [picture rate] is the number of pictures per second (e.g., 30 in the NTSC zone and 25 in the PAL zone). Accordingly, G shows the data rate (bit rate) to be allocated to the time corresponding to N numbers of pictures and x shows the ratio of the sum of coding difficulty of N numbers of pictures to the data rate (bit rate) to be allocated to the time corresponding to N numbers of pictures.

However, x does not necessarily be obtained by using N numbers of pictures but x may be obtained by using the number of pictures which are larger or smaller number than N. However, we must pay attention to the fact that an accuracy in judging the risk of underflow drops when the number taken is far larger than N and changes of parameter x become large when the number taken is far smaller than N.

Then, the operation of the image encoding apparatus 25 according to the second embodiment will be described. The input image signal S25 is inputted to the encoder control unit 26. In the encoder control unit 26, firstly, pictures are sorted in order of I picture, P picture, B picture by the image sorting circuit 41, and then, judged whether they are frame construction or field construction and as a result of the judgment, scan conversion/macro blocking is conducted by a scan conversion/macro blocking circuit 42, and next, in the case of I picture, intra AC is calculated by an intra AC operation circuit 43 and the intra AC data S28 is supplied to the coding control unit 31. Moreover, an output data of the scan conversion/macro blocking circuit 42 is supplied to the FIFO memory 27 and the motion detection circuit 30 through the intra AC operation circuit 43.

The FIFO memory 27, in the coding difficulty calculating unit 63, delaying the input image data by the time necessary for calculating the coding difficulty of N numbers of pictures succeeding the picture coded, outputs to the encoder 28. The motion detection circuit 30, as well as detecting the motion vector and sending this out to a motion compensation circuit 52, sends the ME residue data S29 to the ME residue calculation unit 61.

In the case of P picture, in the encoder 28 the output data of FIFO memory 27 is directly inputted to the DCT circuit 45 and conducted DCT without counting the difference between the predictive image data in the subtracting circuit 44, the DCT coefficient is quantized by the quantization circuit 46, output data of the quantization circuit 46 is variable length coded by the variable length coding circuit 47, output data of the variable length coding circuit 47 is held once by the buffer memory 48 and outputted as the compressed image data S26 formed of bit stream with the fixed bit rate.

Moreover, the output data of the quantization circuit 46 is inverse quantized by an inverse quantization circuit 49 and the output data of the inverse quantization circuit 49 is executed the inverse DCT by the inverse DCT circuit 50 and the output image data of the inverse DCT circuit 50 is supplied to a motion compensation circuit 52 through the adding circuit 51 and will be kept in it.

In the case of P picture, in the encoder 28, predictive image data is formed based on the motion vector from the image data and the motion detection circuit 30 corresponding to the past I picture or P picture held by the motion compensation circuit 52 and the predictive image data is outputted to the subtracting circuit 44 and the adding circuit 51. Moreover, the difference between the output data of the FIFO memory 27 and the predictive image data from the motion compensation circuit 52 is counted by the subtracting circuit 44 and DCT is conducted by the DCT circuit 45, the DCT coefficient is quantized by the quantization circuit 46, the output data of the quantization circuit 46 is variable length coded by the variable length circuit 47, and the output data of the variable length coding circuit 47 is stored once and outputted as the compressed image data S26 by the buffer memory 48. Moreover, the inverse quantization circuit 49 inverse quantizes the output data of the quantization circuit 46 and the inverse DCT circuit 50 conducts the inverse DCT to the output data of the inverse quantization circuit 46, and the adding circuit 51 adds the output data of the inverse DCT circuit 50 to the predictive image data and supplies this to the motion compensation circuit 52 making to hold.

In the case of B picture, in the encoder 28, predictive image data is formed based on two image data corresponding to the past and future I picture or P picture held by the motion compensation circuit 52 and two motion vectors from the motion detection circuit 30 and the predictive image data is outputted to the subtracting circuit 44 and the adding circuit 51. Moreover, the difference between the output data of the FIFO memory 27 and the predictive image data from the motion compensation circuit 52 is counted by the subtracting circuit 44 and executed DCT by the DCT circuit 45, the DCT coefficient is quantized by the quantization circuit 46, the output data of the quantization circuit 46 is variable coded by the variable length coding circuit 47, and upon holding the output data of the variable length coding circuit 47 once, the buffer memory 48 outputs this as the compressed image data S26. B picture will not be kept in the motion compensation circuit 52.

The buffer memory 48 supplies the generation bit rate data S27 which shows the bit rate to be generated by the variable length coding circuit 47 to the coding control unit 31.

Figure 10:
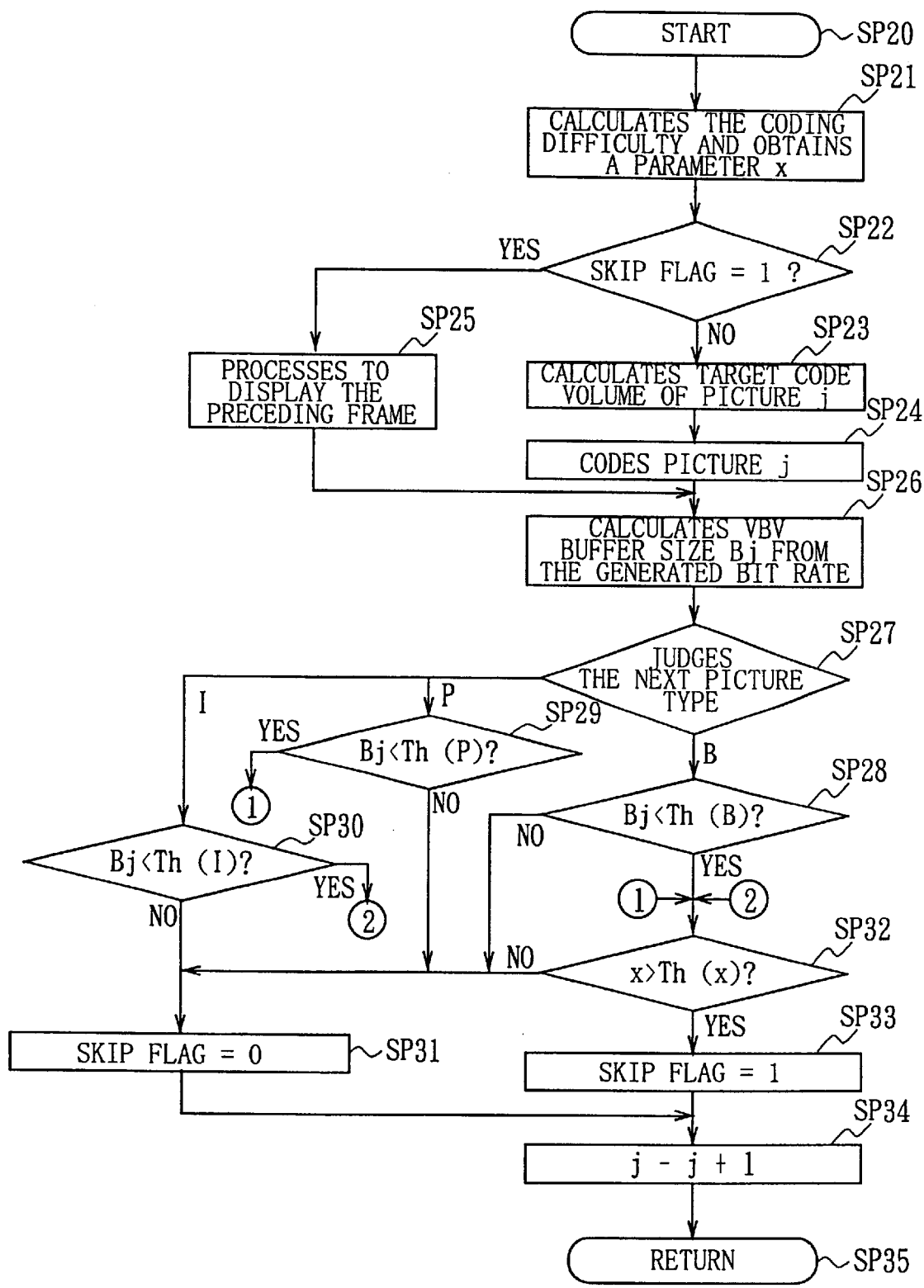
FIG. 10 is a flow chart explaining the function of the coding control section.

Then next, the function of the coding control unit 31 will be described referring to a flow chart of FIG. 10. In this operation, the degree of coding difficulty is calculated from the intra AC data S28 from the intra AC operation circuit 43 and the ME residue calculated at the ME residue calculating unit 61 by the coding difficulty calculating unit 63 and the parameter x is obtained (step S21). The parameter x is calculated based on the degree of coding difficulties of N numbers of pictures following the predictive picture to be coded.

Then, whether the skip flag is "1" or not will be judged (step S22). When the skip flag is "1", it shows that the predictive picture to be coded will be skipped, and when the skip flag is "0", it shows that the predictive picture to be coded will not be skipped.

In the case where the skip flag is "0" (when the negative result is obtained at step S22), the target code volume of picture j will be calculated (step S23) by the target code volume determining unit 64 based on the VBV buffer size calculated by the parameter x and the VBV buffer size calculating unit 62 and will be sent to the quantization index determining unit 65. The picture j means the picture to be coded thereafter.

Then, the quantization index determining unit 65 determines the quantization index corresponding to the quantization characteristic value in the quantization circuit 46 in order that the code generation volume in the encoder 28 becomes the target code volume determined by the target code volume determining unit 64 and sends this to the quantization circuit 46. And then, coding of the picture j will be executed (step S24).

On the other hand, in the case where the skip flag is "1" (when the affirmative result is obtained at step S22), the target code volume determining unit 64 designates the skip control unit 66 to skip the picture j and in response to this the skip control unit 66 processes to display the preceding frame (step S25). More specifically, the skip control circuit 66, as well as controlling the quantization circuit 46 to skip per macro block, sends address information of macro blocks to be skipped to the variable length coding circuit 47. In response to this, the variable length coding circuit 47 after coding the information to be skipped, outputs. Thus, the picture j is coded as the picture to be formed by skip macro blocks which are the macro blocks skipped.

When the step S24 or the step S25 is terminated, the VBV buffer size calculating unit 62 calculates the VBV buffer size Bj from the generated bit rate at the step S24 or the step S25 (step S26). The VBV buffer size Bj can be obtained by subtracting the generated bit rate by the picture j from the VBV buffer size before the picture j is coded and by adding the bit rate to be stored in the VBV buffer at the time of intra I picture. Then, the picture type of the following picture will be judged (step S27). In the case where the picture type is B picture, it is judged whether the VBV buffer size Bj is smaller than the occupancy rate judging threshold Th(B) for the B picture or not (step S28). When the picture type is P picture, it is judged whether the VBV buffer size Bj is smaller than the occupancy rate judging threshold Th(P) for the P picture or not (step S29). In the case where the picture type is I picture, it is judged whether the VBV buffer size Bj is smaller than the occupancy rate judging threshold Th(I) for the I picture or not (step S30). The occupancy rate judging threshold values are set to become Th (B)>Th(P) >Th(I).

When Bj is not smaller than Th(B) (when the negative result is obtained at step S28), Bj is not smaller than Th(P) (when the negative result is obtained at step S29) or Bj is not smaller than Th(I) (when the negative result is obtained at step S30), since it is not necessary to skip the following picture, and skip flag is set to "0" (step S31).

When Bj is smaller than Th(B) (when the affirmative result is obtained at step S28), Bj is smaller than Th(P) (when the affirmative result is obtained at step S29) or Bj is smaller than Th(I) (when the affirmative result is at step S30), it is judged whether the parameter x exceeds the fixed coding difficulty judging threshold value Th(x) or not (step S32). The more the volume of codes generated largely exceeds the target code volume, the threshold value Th(x) is the threshold value to judge whether the picture pattern is more complicated or not. When x is smaller than Th(x) (N), it means that the picture pattern is not so complicated, and since it is not necessary to skip the following picture, skip flag is set to "0" (step S31). On the other hand, in the case where x exceeds Th(x) (when the affirmative result is obtained), it means that complicated picture patterns continue thereafter, it is judged that there is the high possibility of underflow of the VBV buffer, the skip flag is set to "1" to skip the next picture (step S33).

When setting of skip flags (step S31, step S33) is complete, returns to the main routine making j+1 as a new j (step S34) for the processing of the following picture (step SP35).

As described above, in the image encoding apparatus 25 according to the second embodiment, since the threshold value for the VBV buffer size judging is set by picture and as well as skipping in order of B picture, P picture and I picture, skipping would be conducted or not will be judged based on the degree of coding difficulty of several numbers of pictures following the picture already coded, B picture having smaller effect on the picture quality is preferentially skipped in the case where picture patterns of the input image become complicated and underflow of the VBV buffer is likely to occur and in practice, if underflow of the VBV buffer is not likely to occur, the picture would not be skipped and by controlling the effect on the picture quality as small as possible, underflow of the VBV buffer can be avoided.

Furthermore, the present invention is not only limited to the second embodiment described above. But, for example, in the case of judging whether to conduct skipping or not based on the coding difficulty by including the information of whether the degree of coding difficulty is increasing or decreasing in the criteria for judging in addition to the parameter x used in this embodiment, the prediction accuracy on the complexity of picture patterns of the input image will be further improved and the judgment whether to conduct skipping or not can be properly conducted. More specifically, in the case where the coding difficulty is decreasing even though the coding difficulty is large at present, there are cases where underflow of the VBV buffer does not occur even not conducting the skipping, it becomes possible to reduce the number of skipping as small as possible trying not to conduct the skipping when unnecessary. The information on changing tendency of the coding difficulty is obtained from a slope by linear approximating the coding difficulty obtained in time series by the minimum square method for example. In this case, the information of changing tendency on the coding difficulty will be obtained in the coding difficulty calculating unit 63 of FIG. 9 for example.

Furthermore, as shown in FIG. 8, the second embodiment described above has dealt with the case of conducting the feed forward type rate control for controlling the volume of code generation based on the feature of image data before encoded without providing another encoder except the encoder 28. However, the present invention can be applied to the construction in which a first bass encoder different from the encoder 28 to estimate the data rate after being encoded is provided and the feed forward type rate control for controlling the volume of code generation in the second bass encoder 28 based on the data rate estimated by the first bass encoder encoding. In this case, the degree of coding difficulty can be obtained based on the volume of code generation obtained by encoding by the first bass encoder.

Furthermore, the present invention can be applied not only to the construction of conducting the feed forward type rate control but also to the construction of conducting the feedback type rate control to control the volume of code generation based on the volume of code generation obtained by coding in the past represented such as by the famous TM5 (test model 5; ISO/IEC JTC/SC29 (1993)) as a compressed algorithm of MPEG system by estimating the coding difficulty of pictures thereafter based on the coding difficulty of the picture encoded already. In this case, for example, the tendency of the global complexity of the picture encoded in the past will be analyzed, the degree of coding difficulty of several numbers of pictures thereafter will be predicted by linear approximation, and based on this predicted coding difficulty the parameter x used in the embodiment will be obtained, and whether to conduct skipping or not may be judged based on the value of parameter x in the same manner as in the embodiment.

The global complexity is the parameter to show complexity of the screen and related to coding difficulty, and to be precise, it can be obtained as the product of the code generation volume in case of encoding the picture and the average quantization scale code (quantization characteristic value) in case of encoding the picture (refer to "Multimedia, by Television Academic Association MPEG", p.111, published by Ohm-sha).

Furthermore, in the case of obtaining the changing tendency of the degree of coding difficulty by the linear approximation according to the construction in which the feed forward type rate control is conducted or in the case of predicting the degree of coding difficulty of several numbers of pictures thereafter by the linear approximation according to the construction in which the feedback type rate control is conducted, the continuity of coding difficulty will disappear at the time of scene change. Therefore, in the case of scene change, if the processing to obtain the changing tendency of the coding difficulty and the processing to estimate the coding difficulty would be completed before the scene change and if the new processing would be conducted after the scene change, accuracy can be further improved.

Moreover, the degree of coding difficulty may be expressed not only by using the intra AC and ME residue described in the embodiment but also by the other parameter provided that it is the one to express the degree of coding difficulty of picture.

Furthermore, the embodiment described above has dealt with the case of changing the threshold values for judging the VBV buffer size according to picture types. However, the present invention includes the case where the threshold value for judging the VBV buffer size are constant regardless of picture types.

Industrial Applicability

This invention is applicable to a communication system for compressing the image date at a transmission side to transmit it, and a compressed image recording and reproducing device for compressing and recording the image date and extending and outputting the compressed data in reproducing

What is claimed is:

1. An image encoding apparatus for executing a processing as a first coding processing which intra-codes a first image of a predetermined picture unit assigned as the first image coding type from among video signals, for executing a processing as a second coding processing which directionally predictive codes a second image of a predetermined picture unit assigned as the second image coding type from among said video signals, and for executing a processing as a third coding processing which bidirectionally predictive codes a third image of a predetermined picture unit assigned as the third image coding type from among said video signals, and transmitting said coded video signals to the image decoding apparatus, said image encoding apparatus comprising:

image coding type judging means for judging image coding type of object image to be coded;

coding means for executing said first, second or third coding processing based on the output of said image coding type judging means; and coding control means for controlling said coding means to calculate the code generation volume of said coded image, and based on this calculation, to stop said first, second or third coding processing being executed at present in the case of the volume of codes generated that the data occupancy rate in a virtual buffer corresponding to the input buffer of said image decoding apparatus is smaller than the first, second or third threshold value corresponding to said first, second or third image currently being coded from among the first, second and third threshold values of said data occupancy rate set corresponding to said first, second and third coded images.

2. The image encoding apparatus according to claim 1, wherein said first, second and third threshold values are set in increasing order by the first threshold, the second threshold and the third threshold.

3. The image encoding apparatus according to claim 1, wherein said coding control means controls said coding means to stop said coding processing for all images to be decoded by using said predictive image if it is judged that the predictive image of the image to be coded has not been coded based on the output of said coding means.

4. An image coding method for executing a processing as a first coding processing which intra-codes a first image of a predetermined picture unit assigned as the first image coding type from among video signals, for executing a processing as a second coding processing which directionally predictive codes a second image of a predetermined picture unit assigned as the second image coding type from among said video signals, and for executing a processing as a third coding processing which bidirectionally predictive codes a third image of a predetermined picture unit assigned as the third image coding type from among said video signals, and transmitting said coded video signals to the image decoding apparatus, said image encoding apparatus comprising:

a code generation volume calculating step of calculating the volume of codes generated of said coded image; and characterized by:
based on the calculation result of said code generation volume calculating step, in the case of the volume of codes generated that the data occupancy rate in a virtual buffer corresponding to the input buffer of said image decoding apparatus is smaller than said first, second, or third image threshold value corresponding to said first, second or third image currently being coded from among the first, second and third threshold values of said data occupancy rate set corresponding to said first, second and third images.

5. The image coding method according to claim 4, wherein
values of said first, second, and third threshold are set in increasing order by said first threshold, said second threshold and said third threshold.

6. The image coding method according to claim 4, wherein
if said coding has not been conducted on the predictive image of the image to be coded, said coding for all images to be decoded by using said predictive image will be stopped.

7. An image encoding apparatus for executing a processing as a first coding processing which intra-codes a first image of a predetermined picture unit assigned as the first image coding type from among video signals, for executing, as a second coding processing, either of a processing which directionally predictive codes a second image of a predetermined picture unit assigned as the second image coding type from among said video signals and a processing which bidirectionally predictive codes a third image of a predetermined picture unit assigned as the third image coding type from among said video signals, and transmitting said coded video signals to the image decoding apparatus, said image encoding apparatus comprising:

image coding type judging means for judging image coding type of object image to be coded;
coding means for executing said first, second or third coding processing based on the output of said image coding type judging means; and
coding control means for controlling said coding means to calculate the code generation volume of said coded image and based on this calculation, to stop said first or second coding processing being executed at present in the case of the volume of codes generated that the data occupancy rate in a virtual buffer corresponding to the input buffer of said image decoding apparatus is smaller than the first or second threshold value corresponding to said first or second image currently being coded from among the first and second threshold values of said data occupancy rate set corresponding to said first and second coded images.

8. The image encoding apparatus according to claim 7, wherein
said first and second threshold values are set in increasing order by the first threshold and the second threshold.

9. The image encoding apparatus according to claim 7, wherein
said coding control means controls said coding means to stop said coding processing for all images to be decoded by using said predictive image if it is judged that the predictive image of the image to be coded has not been coded based on the output of said coding means.

10. An image coding method for executing a processing as a first coding processing which intra-codes a first image of a predetermined picture unit assigned as the first image coding type from among video signals, for executing, as a second coding processing, either of a processing which directionally predictive codes a second image of a predetermined picture unit assigned as the second image coding type from among said video signals and a processing which bidirectionally predictive codes a third image of a predetermined picture unit assigned as the third image coding type from among said video signals, and transmitting said coded video signals to the image decoding apparatus, said image coding method comprising:

a code generation volume calculating step of calculating the volume of codes generated of said coded image; and characterized by:
based on the calculation result of said code generation volume calculating step, in the case of the volume of codes generated that the data occupancy rate in a virtual buffer corresponding to the input buffer of said image decoding apparatus is smaller than said first or second image threshold value corresponding to said first or second image currently being coded from among the first and second threshold values of said data occupancy rate set corresponding to said first and second images.

11. The image coding method according to claim 10, wherein
values of said first and second threshold are set in increasing order by said first threshold and the second threshold.

12. The image coding method according to claim 10, wherein
if said coding has not been conducted on the predictive image to be coded, said coding for all images to be decoded by using said predictive image will be stopped.

* * * * *